UNITED STATES PATENT OFFICE 2,270,987

PROCESS OF SILVER SOLDERING

John E. Woods, Brookline, Mass., assignor to Clifford Manufacturing Co., Boston, Mass., a corporation of Delaware No Drawing. Application February 10, 1940, Serial No. 318,330

3 Claims. (Cl. 148—4)

The present invention is concerned with a method of bonding a thin wall diaphragm to a relatively massive fitting by silver solder or its equivalent.

In the fabrication of articles employing warped surface diaphragms or bellows, which from the standpoint of the present invention may be considered as a class of diaphragms, it is frequently necessary to bond the relatively thin wall diaphragm to a more massive fitting, which may be a casting, forging, screw machine part or stamping, but which is invariably heavier and slower to assume the soldering temperature than is the diaphragm, which is of a relatively thin wall structure and composed of a material which transmits heat readily. The only material now known for connecting such materials with a high temperature bond is silver solder in one of its forms, which may have a melting point from 1175° F. to 1700° F., depending on the composition. Although such a material may be effectively employed to secure a permanent high temperature bond, nevertheless it involves serious and in some cases insurmountable problems if it is attempted to form the bond in the orthodox fashion with a soldering iron, torch or the like. In the first place, such an operation must be carried out in a manner to avoid injurious annealing of the diaphragm which will cause it to lose its spring characteristics introduced by the previous cold working in the formation of the diaphragm. In the second place, the local application of heat, even though the diaphragm can be partially protected, invariably warps the fitting and permanently distorts it in such a fashion as to require further machining, grinding or similar treatment to restore its contour and dimensions.

I have discovered that if the diaphragm is made of a material such as Monel or stainless steel having an 18–8 composition, and if the prior cold working to form the diaphragm has not over-stressed the metal which will otherwise cause annealing at 750° to 900°, it may be assembled with a fitting, subjected to a temperature of 1250° approximately and bonded without injury. I have found also that an amount of cold working on the diaphragm which is approximately the equivalent of 25% to 30% reduction in area does not cause injurious annealing below a temperature of 1350° F. to 1450° F. If such a diaphragm is then assembled with a fitting of proper dimensions, mechanically held in assembled relation with a ring of silver solder properly located to flow by gravity into the joint when the soldering temperature is achieved, and this assembly subjected to a temperature of 1250° F. in a reducing atmosphere, satisfactory bonding may be obtained without annealing of the diaphragm, and without distortion of the fitting. The soldering operation may be carried out in any conventional type of furnace having a reducing atmosphere and where the temperature may be closely regulated and controlled.

With such a mode of operation where it is desirable to case-harden the fitting, as in the case of a seal nose or the like, or in the case of certain types of diaphragm such as steel or copper beryllium, a subsequent operation may be performed. In this case the improvement may be secured by subjecting the assembly to a quenching operation either in water, oil, or even in air. Obviously if in air, the atmosphere should be of reducing character to prevent oxidation. In the case of a diaphragm it may then be subsequently reheated and drawn back to toughen at temperatures of 700° F. or thereabouts. In the case of a steel fitting where it is desirable to case-harden at furnace heat, the silver solder may be raised very quickly bringing the outside surface of the steel nose up to temperature and silver soldering it to the diaphragm. Thereafter by quenching a hardened case is formed upon the seal nose.

What is claimed is:

1. The process of silver soldering a metallic diaphragm having a relatively thin wall to a comparatively massive fitting, which consists in cold working a diaphragm to an amount not exceeding a 35% reduction in area, the metal of the diaphragm having a normal annealing point on the order of 1400° F. or thereabouts, assembling the cold worked diaphragm with a fitting combined with a ring of silver solder properly located and held in position, and subjecting the assembly to a closely controlled temperature on the order of 1250° F. in a reducing atmosphere for a sufficient period of time to bring the assembly to the temperature of the surrounding region and cause the silver solder to flow into the joint.

2. The process of silver soldering a metallic diaphragm having a relatively thin wall to a comparatively massive fitting, which consists in cold working a diaphragm to an amount not exceeding a 35% reduction in area, the metal of the diaphragm having a normal annealing point on the order of 1400° F. or thereabouts, assembling the cold worked diaphragm with a fitting combined with a ring of silver solder properly located and held in position, subjecting the assembly to a closely controlled temperature on the order of 1250° F. in a reducing atmosphere for a sufficient period of time to bring the assembly to the temperature of the surrounding region and cause the silver solder to flow into the joint, and thereafter subjecting the assembly to a quenching action to case-harden the fitting.

3. The process of silver soldering a metallic diaphragm having a relatively thin wall to a comparatively massive fitting, which consists in cold working a diaphragm to an amount not exceeding a 35% reduction in area, the metal of the diaphragm being selected from the group consisting of Monel metal and stainless steel and having a normal annealing point on the order of 1400° F. or thereabouts, assembling the cold worked diaphragm with a fitting combined with a ring of silver solder properly located and held in position, and subjecting the assembly to a closely controlled temperature on the order of 1250° F. in a reducing atmosphere for a sufficient period of time to bring the assembly to the temperature of the surrounding region and cause the silver solder to flow into the joint.

JOHN E. WOODS.